US007720915B2

(12) United States Patent
Malik

(10) Patent No.: US 7,720,915 B2
(45) Date of Patent: *May 18, 2010

(54) METHOD AND APPARATUS FOR CONFIGURING ELECTRONIC MAIL ACCORDING TO A USER-SELECTED TYPE

(75) Inventor: Dale W. Malik, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 388 days.

This patent is subject to a terminal disclaimer.

(21) Appl. No.: 11/296,754

(22) Filed: Dec. 7, 2005

(65) Prior Publication Data

US 2006/0089972 A1 Apr. 27, 2006

Related U.S. Application Data

(63) Continuation of application No. 09/563,930, filed on May 4, 2000, now Pat. No. 7,007,066.

(51) Int. Cl.
G06F 15/16 (2006.01)

(52) U.S. Cl. ........................ 709/206; 709/204; 709/201; 709/219

(58) Field of Classification Search ......... 709/204–205, 709/219, 201
See application file for complete search history.

(56) References Cited

U.S. PATENT DOCUMENTS

| 5,375,235 | A | 12/1994 | Berry et al. |
| 5,559,800 | A | 9/1996 | Mousseau et al. |
| 5,649,222 | A | 7/1997 | Mogilevsky |
| 5,781,901 | A | 7/1998 | Kuzma |
| 5,796,948 | A | 8/1998 | Cohen |
| 5,819,260 | A | 10/1998 | Lu et al. |
| 6,012,075 | A | 1/2000 | Fein et al. |
| 6,026,410 | A | 2/2000 | Allen et al. |
| 6,057,841 | A | 5/2000 | Thurlow et al. |
| 6,073,133 | A | 6/2000 | Chrabaszcz |
| 6,199,103 | B1 | 3/2001 | Sakaguchi et al. |
| 6,212,553 | B1 | 4/2001 | Lee et al. |
| 6,219,694 | B1 | 4/2001 | Lazaridis et al. |
| 6,295,058 | B1 | 9/2001 | Hsu et al. |
| 6,334,142 | B1 * | 12/2001 | Newton et al. ............... 709/206 |
| 6,349,295 | B1 | 2/2002 | Tedesco et al. |
| 6,356,937 | B1 | 3/2002 | Montville et al. |
| 6,377,949 | B1 | 4/2002 | Gilmour |

(Continued)

OTHER PUBLICATIONS

Malik; Non-Final Rejection mailed Jan. 10, 2008; U.S. Appl. No. 11/292,639, filed Dec. 2, 2005.

(Continued)

Primary Examiner—Lashonda Jacobs
Assistant Examiner—Sahera Halim
(74) Attorney, Agent, or Firm—Thomas, Kayden, Horstemeyer & Risley, LLP

(57) ABSTRACT

The present invention is directed to a method and apparatus for reminding a user to include an e-mail attachment file with an e-mail communication. The e-mail application is configured to provide a menu of different types of e-mail for the user to select, and to provide templates that require the user to attach an attachment file when that option is selected.

24 Claims, 6 Drawing Sheets

U.S. PATENT DOCUMENTS

| | | | |
|---|---|---|---|
| 6,405,225 | B1 | 6/2002 | Apfel et al. |
| 6,453,338 | B1 | 9/2002 | Shiono |
| 6,460,074 | B1 | 10/2002 | Fishkin |
| 6,505,237 | B2 | 1/2003 | Beyda et al. |
| 6,507,865 | B1 | 1/2003 | Hanson |
| 6,701,378 | B1 | 3/2004 | Gilhuly et al. |
| 6,725,228 | B1 | 4/2004 | Clark et al. |
| 6,779,019 | B1 | 8/2004 | Mousseau et al. |
| 6,785,712 | B1 | 8/2004 | Hogan et al. |
| 6,859,213 | B1 | 2/2005 | Carter |
| 6,970,908 | B1 | 11/2005 | Larky et al. |
| 6,981,023 | B1 | 12/2005 | Hamilton et al. |
| 7,007,066 | B1 * | 2/2006 | Malik ......................... 709/206 |
| 7,016,937 | B1 | 3/2006 | Malik |
| 7,315,828 | B1 | 1/2008 | McCarthy et al. |
| 7,447,743 | B1 | 11/2008 | Jordan, Jr. |
| 2001/0037315 | A1 | 11/2001 | Saliba et al. |
| 2002/0016818 | A1 | 2/2002 | Kirani et al. |
| 2002/0104026 | A1 | 8/2002 | Barra et al. |
| 2002/0116508 | A1 | 8/2002 | Khan et al. |
| 2003/0028600 | A1 | 2/2003 | Parker |
| 2003/0135570 | A1 | 7/2003 | Anquetil |
| 2003/0187797 | A1 | 10/2003 | Song et al. |

OTHER PUBLICATIONS

Southwest Missouri State University; "Introduction to Microsoft", Computer Services, Southwest Missouri State University, Springfield, MO, 1998, 39 pages.

Mosher; "Recieving and Responding to E-mail messages", http://www.windowsitlibrary.com/Content/238/12/2.html, Feb. 1997, 6 pages.

Fulton; "Easy Microsoft Outlook 97", J. Que , Copyright 1997, pp. 50-51 and 70-77.

Mosher; "Sending E-mail Messages", Duke Press, Feb. 1997, 3 pages.

Mosher; "Sending E-mail Messages (Inserting Filles, Messages, and Objects)", Duke Press, Feb. 1997, 5 pages.

Mosher; "Receiving and Responding to E-mail Messages", Duke Press, Feb. 1997, 4 pages.

Malik; U.S. Appl. No. 09/563,927, filed May 4, 2000.

Malik; U.S. Appl. No. 09/563,930, filed May 4, 2000.

Malik; Non-Final Rejection mailed Sep. 17, 2003; U.S. Appl. No. 09/563,927, filed May 4, 2000.

Malik; Non-Final Rejection mailed Mar. 22, 2004; U.S. Appl. No. 09/563,927, filed May 4, 2000.

Malik; Final Rejection mailed Sep. 17, 2004; U.S. Appl. No. 09/563,927, filed May 4, 2000.

Malik; Final Rejection mailed Sep. 26, 2004; U.S. Appl. No. 09/563,927, filed May 4, 2000.

Malik; Examiner Interview Summary Record mailed Oct. 26, 2004; U.S. Appl. No. 09/563,927, filed May 4, 2000.

Malik; Notice of Allowance and Fees Due mailed Apr. 26, 2005; U.S. Appl. No. 09/563,927, filed May 4, 2000.

Malik; Notice of Allowance and Fees Due mailed Dec. 15, 2005; U.S. Appl. No. 09/563,927, filed May 4, 2000.

Malik; Non-Final Rejection mailed Apr. 4, 2003; U.S. Appl. No. 09/563,930, filed May 4, 2000.

Malik; Non-Final Rejection mailed Sep. 8, 2003; U.S. Appl. No. 09/563,930, filed May 4, 2000.

Malik; Final Rejection mailed Feb. 25, 2004; U.S. Appl. No. 09/563,930, filed May 4, 2000.

Malik; Advisory Action mailed Jul. 2, 2004; U.S. Appl. No. 09/563,930, filed May 4, 2000.

Malik; Non-Final Rejection mailed Sep. 9, 2004; U.S. Appl. No. 09/563,930, filed May 4, 2000.

Malik; Examiner Interview Summary Record mailed Oct. 5, 2004; U.S. Appl. No. 09/563,930, filed May 4, 2000.

Malik; Notice of Allowance and Fees Due mailed Mar. 31, 2005; U.S. Appl. No. 09/563,930, filed May 4, 2000.

Malik; Notice of Allowance and Fees Due mailed Nov. 18, 2005; U.S. Appl. No. 09/563,930, filed May 4, 2000.

Malik; U.S. Appl. No. 11/292,639, filed Dec. 2, 2005.

Introduction to Microsoft Outlook; revised Feb. 1998 (SMC), 36 pages.

Malik; Non-Final Rejection mailed Jan. 10, 2008 for U.S. Appl. No. 11/292,639, filed Dec. 2, 2005.

Malik; Non-Final Rejection mailed Jun. 5, 2008 for U.S. Appl. No. 11/292,639, filed Dec. 2, 2005.

Malik; Final Rejection mailed Oct. 28, 2008 for U.S. Appl. No. 11/292,639, filed Dec. 2, 2005.

Malik; Non-Final Rejection mailed Aug. 17, 2009 for U.S. Appl. No. 11/292,639, filed Dec. 2, 2005.

"AirDoc Platform™," printed from http://www.arizan.com/solutions/solutions_airdoc_platform.html on Feb. 20, 2002; 2 pages.

"BlackBerry Wireless Email Enhancements," printed from http://www.mi8.com/static/product_detail/BlackBerryAddon.asp on Feb. 20, 2002; 3 pages.

"Itrezzo Integrated Messaging," printed from http://www.itrezzo.com/services.htm on Feb. 20, 2002; 3 pages.

"Itrezzo Licenses Arizan Technology to Extend Features for Wireless Users," printed from http://www.itrezzo.com/Press_Releases/rim_blackberry_press_011602.ntm on Feb. 20, 2002; 2 pages.

"METAmessage for Wireless," printed from http://onsettechnology.com/pr2_mm.htm on Feb. 20, 2002; 3 pages.

"NeedText Attachment Opener," printed from http://www.needtext.net/attachment/index.xml on Feb. 20, 2002; 2 pages.

"Onset Announces Email Attachment and Fax Solutions," printed from http://www.intranetjournal.com/articles/200102/na_02_21_01d.html on Feb. 20, 2002; 4 pages.

"Using My Docs Online with a RIM BlackBerry™ Pager," printed from http://www.mydocsonline.com/info_using_blackberry.html on Feb. 20, 2002; 2 pages.

Malik; Final Rejection mailed Apr. 17, 2008 for U.S. Appl. No. 10/326,250, filed Dec. 19, 2002.

Malik; Final Rejection mailed Jun. 5, 2007 for U.S. Appl. No. 10/326,250, filed Dec. 19, 2002.

Malik; Non-Final Rejection mailed Jun. 2, 2006 for U.S. Appl. No. 10/326,250, filed Dec. 19, 2002.

Malik; Non-Final Rejection mailed Oct. 6, 2008 for U.S. Appl. No. 10/326,250, filed Dec. 19, 2002.

Malik; Non-Final Rejection mailed Oct. 23, 2007 for U.S. Appl. No. 10/326,250, filed Dec. 19, 2002.

Malik; Non-Final Rejection mailed Nov. 16, 2006 for U.S. Appl. No. 10/326,250, filed Dec. 19, 2002.

Malik; U.S. Appl. No. 10/326,250, filed Dec. 19, 2002.

Jordan; Examiner Interview mailed Mar. 30, 2005 for U.S. Appl. No. 09/943,836, filed Aug. 31, 2001.

Jordan; Examiner Interview mailed Apr. 7, 2006 for U.S. Appl. No. 09/943,836, filed Aug. 31, 2001.

Jordan; Examiner Interview mailed Nov. 30, 2004 for U.S. Appl. No. 09/943,836, filed Aug. 31, 2001.

Jordan; Examiner Interview mailed Dec. 20, 2006 for U.S. Appl. No. 09/943,836, filed Aug. 31, 2001.

Jordan; Final Rejection mailed Feb. 8, 2006 for U.S. Appl. No. 09/943,836, filed Aug. 31, 2001.

Jordan; Final Rejection mailed Mar. 1, 2005 for U.S. Appl. No. 09/943,836, filed Aug. 31, 2001.

Jordan; Final Rejection mailed Sep. 24, 2007 for U.S. Appl. No. 09/943,836, filed Aug. 31, 2001.

Jordan; Non-Final Rejection mailed Jan. 31, 2008 for U.S. Appl. No. 09/943,836, filed Aug. 31, 2001.

Jordan; Non-Final Rejection mailed Apr. 10, 2007 for U.S. Appl. No. 09/943,836, filed Aug. 31, 2001.

Jordan; Non-Final Rejection mailed Aug. 18, 2005 for U.S. Appl. No. 09/943,836, filed Aug. 31, 2001.

Jordan; Non-Final Rejection mailed Oct. 11, 2006 for U.S. Appl. No. 09/943,836, filed Aug. 31, 2001.

Jordan; Non-Final Rejection mailed Oct. 22, 2004 for U.S. Appl. No. 09/943,836, filed Aug. 31, 2001.

Jordan; Notice of Allowance and Fees due mailed Aug. 1, 2008 for U.S. Appl. No. 09/943,836, filed Aug. 31, 2001.

Jordan; U.S. Appl. No. 09/943,836, filed Aug. 31, 2001.

Bott and Person. Special Edition using Windows 98 Second Edition. Que. Dec. 1999, 3 pages.

MAD Solutions; Attachment Executive Version 3.0, Apr. 2001; pp. 1-39.

Qualcomm. Eudora Email User Manual for Windows Version 5.1, Mar. 2001; 3 pages.

Sams. Sams teach yourself windows 98 in 10 minutes. Sams Publishing. May 1998; 3 pages.

Sperry Software. Attachment Save for Outlook 2000/2002. Dated to Aug. 6, 2002 via wayback machine at http://www.archive.org; 2 pages.

* cited by examiner

Figure 3

What would you like to do?

o Review received messages o Compose new e-mail o Reply to a received message

Figure 4

What type of e-mail would like to send?

o Message o Attachment o Message with Attachment

To whom would you like to send your e-mail?

Single Recipient

- Within Network

- Outside of Network

Multiple Recipients

- I will supply addresses

- Select from Mail group

What type of attachments are being sent?

- Word processing documents

- Spreadsheet files

- Graphics files

- Video/Audio files

- Speech files

Figure 7

E-Mail Message

To:

From:

Re:

Message:

Figure 8

E-Mail Attachment

To:

From:

Re:

File Name and Path:

METHOD AND APPARATUS FOR CONFIGURING ELECTRONIC MAIL ACCORDING TO A USER-SELECTED TYPE

CROSS-REFERENCE TO RELATED APPLICATION

This application is a continuation of U.S. utility application having Ser. No. 09/563,930, filed May 4, 2000, now U.S. Pat. No. 7,007,066 which is entirely incorporated herein by reference.

FIELD OF THE INVENTION

The present invention relates to the transmission of electronic mail over computer networks, and more particularly, to a method and apparatus for configuring the composition of electronic mail according to a type and category selected by the user from a menu of options.

DESCRIPTION OF THE RELATED ART

During the past decade, electronic mail ("e-mail") has become an indispensable tool for facilitating business and personal communications. Through computer networking systems such as local-area networks ("LAN"), wide-area networks ("WAN"), and the world-wide web ("WWW"), network users can send and receive notes, messages, letters, etc., to communicate with others who are in the same office or perhaps in remote locations across the world.

E-mail application programs are typically configured for generating messages in the form of memoranda. These programs guide a user to "compose" an e-mail message by providing a platform for entering at least one outgoing e-mail address, a "subject" heading, and a "body" for the actual message. When the user completes typing the message and presses the "send" key, the message is transmitted over the network and arrives at the provided destination address. E-mail is often used for sending relatively short messages that are only a few sentences in length.

Most e-mail application programs also allow a user to attach a file to be sent along with a message as an "attachment." In the accompanying e-mail message, the sender may introduce or explain the significance of the attachments. Attachment files might include word processing documents, graphics files, executable programs, spreadsheet reports, etc. A recipient will receive the e-mail message plus any attached files, which may then be opened and accessed through the appropriate application software. In many applications, it is preferable to send documents through e-mail attachments instead of a facsimile because the recipient can then store, edit, and print an original file. For long-distance communications, it is also less costly to send documents via e-mail as compared with a facsimile.

In order to send an attachment with most e-mail application programs, a user first composes a message in the ordinary course by specifying a destination address, a subject heading, and a message. The user then selects the "attachment" icon and selects a file that is stored in memory or on floppy disk. Upon selecting a file and selecting the "ok" icon, the user finally selects the "send" option to begin transmission of the e-mail.

There are several problems that users often encounter when sending e-mail attachment files. As an initial matter, it is possible that a user cannot understand how to utilize the e-mail application program to compose e-mail, review received e-mail, or reply to e-mail that was received. Further, it is also relatively common for a user to forget to send an attachment along with a message when composing an e-mail. In some circumstances, sending an e-mail without the intended attachments can lead to confusion, or at least embarrassment, because the user referred in the sent message to an attached file that has not been sent. These problems significantly reduce the benefits of e-mail systems and may negatively affect a user's productivity when engaging in electronic mail communications.

SUMMARY OF THE INVENTION

In view of the difficulties encountered with sending attachments to e-mail communications described above, there is a need for a method and apparatus for configuring an electronic mail communication such that the user is prompted at the appropriate time to attach a file to an e-mail if desired.

In accordance with the present invention, a user can be reminded to include an attachment file by being prompted within the e-mail application if the user selects an option from a menu of different e-mail types that includes an e-mail attachment. The user is unable to send the e-mail communication without providing an attachment file or reconfiguring the e-mail to be of a type that does not include an attachment.

The present invention also provides a method for composing an e-mail communication in a menu-driven e-mail application. The user is guided through each option for utilizing the e-mail application through a series of menus.

Accordingly, the present invention provides a method for configuring an e-mail communication. A menu of a plurality of different types of e-mail communications is displayed, wherein at least one of the types of e-mail communication is comprised of a plurality of components. A selection of a type is received through a user interface. In response, a template is provided for each component of the type selected, wherein the templates identify fields necessary for assembling the respective components of an e-mail communication.

The present invention further provides a method for configuring an e-mail communication through a menu-based user interface. A first menu of a plurality of different activities associated with an e-mail applications program is provided. A user selects an activity from the first menu through a user interface. In response to a selection from the first menu, a second menu of a plurality of different types of e-mail communications is provided, wherein at least one of the types of e-mail communication is comprised of a plurality of components. A user selects a type of e-mail communication through the user interface. A template is provided for each component of the type selected by the user from the second menu, wherein the templates identify fields necessary for the user to assemble the respective components of an e-mail communication. A series of additional menus are provided for different fields in the template, wherein each menu provides a series of options for determining the information required for each respective field.

The present invention also provides an interface for configuring e-mail communications based on a user-selected type. This includes a menu display of different types of e-mail communications, wherein at least one of the types of e-mail communication is comprised of a plurality of components, an input means for receiving a selection of a type from a user, and a processor for generating a template for each component of the type of e-mail communication selected by the user, wherein the templates identify fields necessary for the user to compose the respective components of an e-mail communication.

The present invention additionally includes an e-mail communications system for configuring e-mail communications. This includes a first data base for storing a plurality of menus, each menu providing a list of options for composing an e-mail communication. A second data base stores a plurality of templates, where each template is associated with an option and identifies fields necessary for transmission of the e-mail communication having the selected options. A user interface displays the plurality of menus from the first data base, receives selections of options, and provides the plurality of templates in response to selections of options. A network interface transmits an assembled e-mail communication when information is provided for each of the necessary fields.

The present invention also provides a method for reminding a user to include an attachment file with an e-mail communication. A menu is provided from which the user selects to assemble an e-mail communication having an attachment file. A template is provided for the user to identify an attachment file to be included in the e-mail communication. The e-mail communication is transmitted only after an attachment file is included.

BRIEF DESCRIPTION OF THE DRAWINGS

FIG. 3 is a graphical user interface of an initial menu of e-mail activities in an e-mail application program of the present invention.

FIG. 4 is a graphical user interface of a secondary menu of e-mail types in an e-mail application program of the present invention.

FIG. 5 is a graphical user interface of a template for composing an e-mail message according to the present invention.

FIG. 6. is a graphical user interface of a template for composing an e-mail attachment according to the present invention.

FIG. 7 is a graphical user interface of a menu according to the present invention.

FIG. 8 is a graphical user interface of a menu according to the present invention.

DETAILED DESCRIPTION OF THE PREFERRED EMBODIMENTS

Figure 1A:
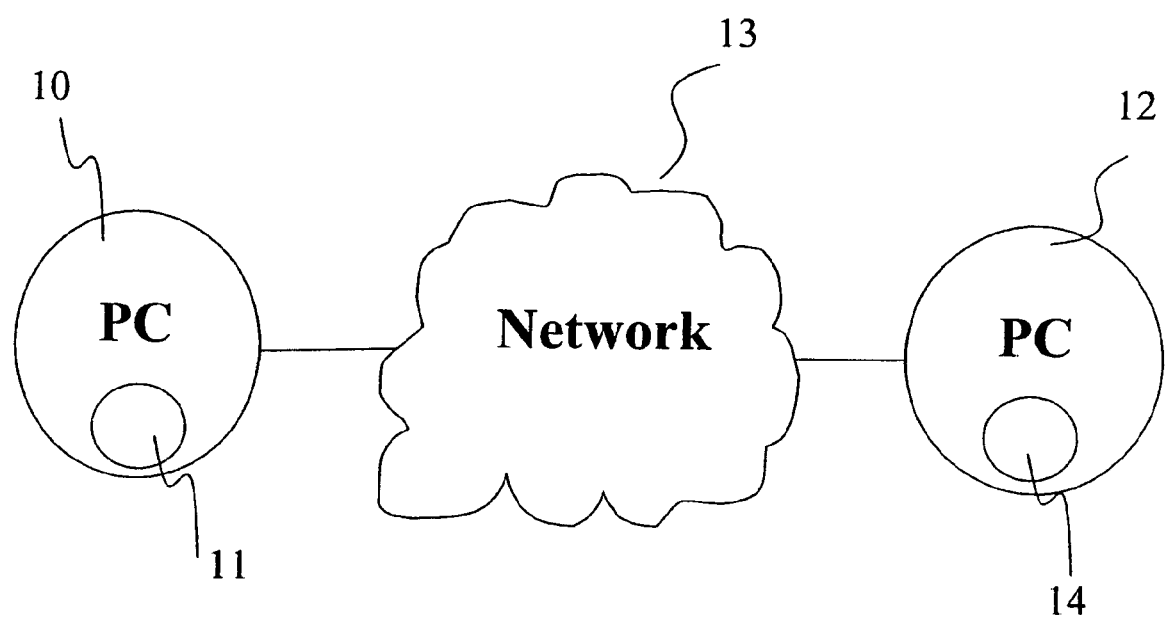
FIG. 1a is a schematic diagram of a basic computer network system in accordance with an embodiment of the present invention.

The present invention will now be described in more detail with reference to the figures. FIG. 1a is a schematic diagram of a basic computer network system in accordance with a preferred embodiment of the present invention, in which computer 10 is connected to computer 12 through a network 13 to facilitate e-mail communications with attachments. Computer 10 has an e-mail communications user interface 11 that permits the computer to send e-mail communications using network 13. Likewise, computer 12 has an e-mail communications user interface 14 that permits the computer to receive e-mail communications from network 13. The term computer in this description is not limited to any particular type of computer, and may include computer systems having many computers, or only a portion of a computer. Network 13 can be in the form of a wired network or a wireless network. The network may be a simple, single communication path, or it may include one or several LANs or WANs, the world wide web, or any combination thereof. Computers 10 and 12 may be the only computers connected to the network 13, or the network may be shared by many other computers.

The configuration of the e-mail application interface of the present invention prompts the user to first specify what type or category of e-mail communication is to be transmitted. For example, with regard to e-mail "types," a user may wish to simply send an e-mail message, or may intend to send solely an e-mail attachment file. As another type of e-mail communication, the user may wish to send an e-mail message accompanied by an attachment file. These are three different types of e-mail communications. There are also several categories associated with an e-mail communication that is to be composed. For example, the user may wish to send the e-mail to a single recipient or to a plurality of recipients. If the user chooses to attach a file, there are also several categories of attachments, such as wordprocessing files, graphics files, audio/video files, or speech files. Once the user selects the type and categories associated with the e-mail communication to be composed, an e-mail application program can then configure the e-mail communication to include all of the required fields to ensure proper transmission of a properly composed e-mail.

The user chooses the type and category associated with the e-mail communication to be composed according to a menu provided to the user. The user can then select options and features from the menu, which govern the configuration of the resulting e-mail communication. The user can opt to customize the menu to add or remove features in order to facilitate rapid composition of e-mail communications.

According to the type and categories selected by the user, the e-mail application program provides a series of templates for which the user supplies information. Transmission of the e-mail communication is suspended until the user supplies all of the information required for each selected e-mail component.

Figure 1B:
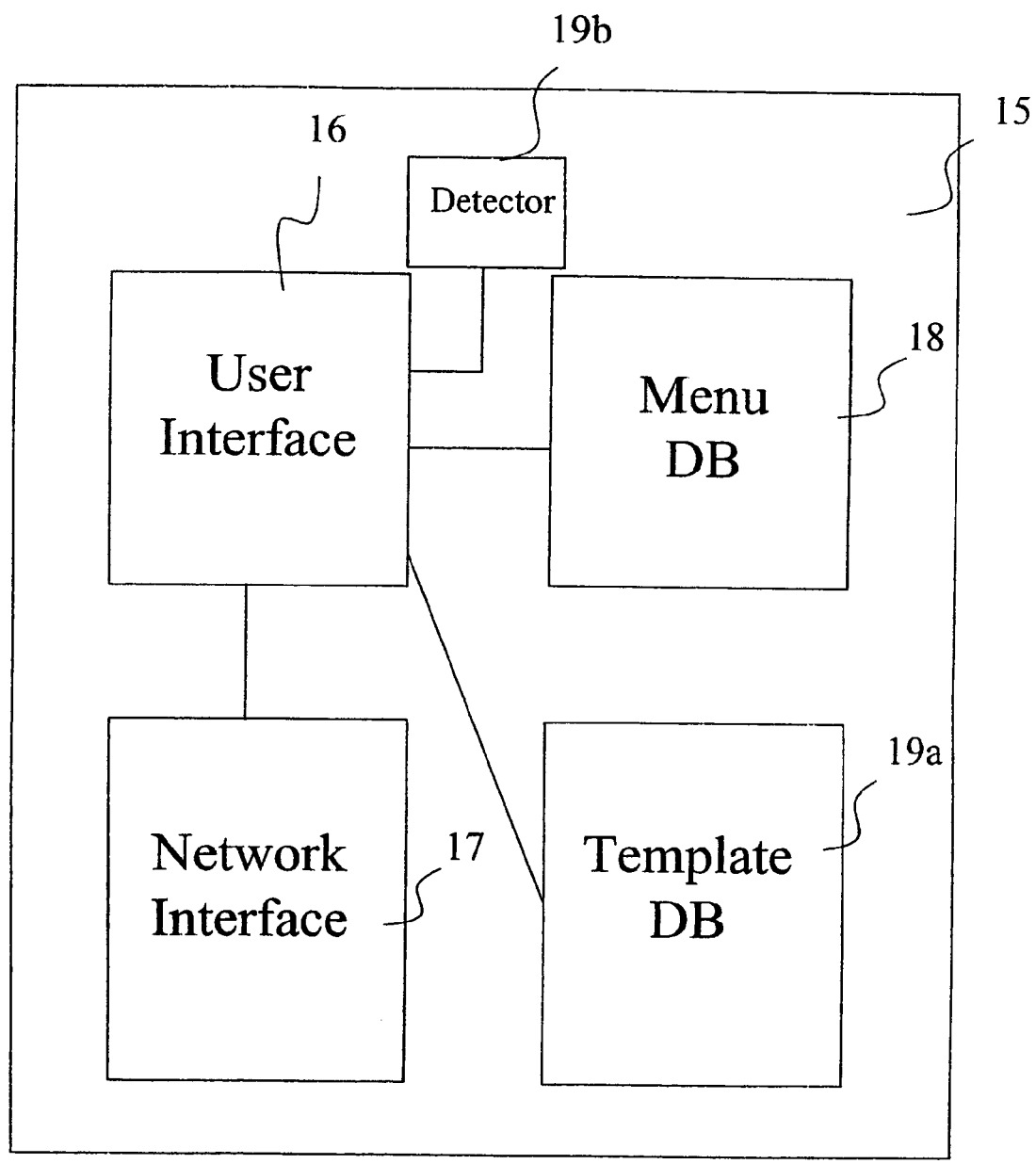
FIG. 1b is a schematic diagram of an e-mail communications system in accordance with an embodiment of the present invention.

FIG. 1b illustrates a schematic of an e-mail communications system according to this embodiment. E-mail communications system 15 includes a user interface 16 providing a user display and receiving information input from the user. Attached to user interface 16 is network interface 17, which may be connected to a LAN, data line, or any other networking communications interface for transmitting and receiving e-mail communications. The user interface 16 is connected to a first database, which is a menu database 18. The menu database stores data pertaining to all menus to be provided to the user, which provide options in composing e-mail communications. The user interface is additionally attached to a second database, which is a template database 19. The template database 19 stores information necessary for providing templates, which are used for composing e-mail communications having the user-specified options from the menu database 18. A detector 19b detects whether the user has supplied information for each of the fields in the template.

Figure 2:
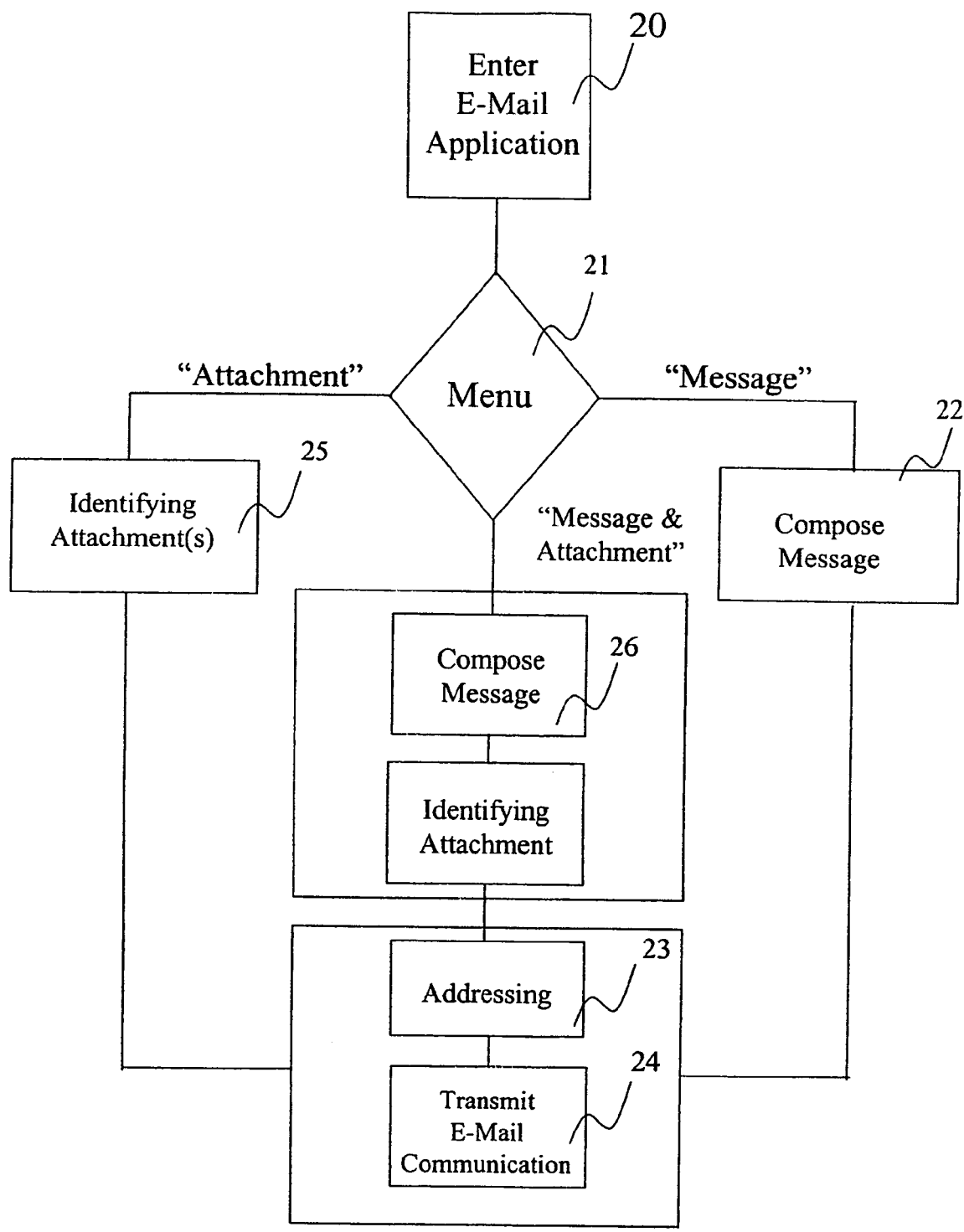
FIG. 2 is a flow diagram of an e-mail menu configuration embodiment of the present invention.

FIG. 2 illustrates the operation of the e-mail configuration application according to this embodiment. Upon the selection of the e-mail communication application 20, the system first prompts the user to select from a menu the type of e-mail communication that is to be transmitted, as in step 21. Once the user chooses from the menu of e-mail communication categories, the system configures the e-mail communication to facilitate composition of each requisite portion of the desired e-mail communication.

If the user chooses to simply send an e-mail message, then the system provides a template for composing a message, as in step 22. Once the user completes the message and indicates that the message is finished, the user enters the destination address information, as in step 23, and the message is then sent, according to step 24. Likewise, if the user chooses to simply send an attachment file, the system requires the user to identify one or more files to be sent as an e-mail communication, as in step 25. Once the user finishes identifying all attachments that are to be sent, the system then prompts the user to enter the destination address information and then sends the attachments, as in steps 23 and 24, respectively. In this embodiment, the system will not transmit an e-mail message or an attachment until it detects that the user supplied all of the necessary components of a message or an attachment, respectively.

If the user's menu selection indicates that the desired transmission is an e-mail message and an e-mail attachment, the system provides templates to the user for both components of the e-mail communication, as in step 26. The system does not transmit the e-mail communication until both the requisite components of an e-mail message and at least one attachment file are provided.

The system described in this embodiment is configured to transmit e-mail communications along the network illustrated in FIG. 1. E-mail communications interface 11 within computer 10 can incorporate the above-described features to provide prompts and templates for composition of e-mail messages, e-mail attachments, or other combinations e-mail communications. Once the e-mail communication described with respect to FIG. 2 is "sent," as in step 24, the e-mail communication is propagated along network 13 to computer 12.

FIGS. 3-7 show examples of graphical user interface (GUI) screen displays, which may be used according to the invention to begin configuration of an e-mail communication. Of course, these may be displayed on a monitor for a computer terminal, workstation, etc. The GUI in FIG. 3 provides an example of an initial menu for the user to choose how to utilize the e-mail application program. The user can choose between "Review received message," "Compose new e-mail," or "Reply to received message." This system is not limited to these three delineated activities, but may additionally include other activities associated with electronic mail communications, such as editing a pre-composed message.

If the user chooses to "Compose a new e-mail," a new menu is displayed, for example, as the menu shown in FIG. 4. The user is provided with a menu of three different types of e-mail communications to send. If the user chooses to send a "Message," the GUI as shown in FIG. 5 next appears on the screen. This GUI provides a template for composing an e-mail message. By selecting the field labeled "To" in the template, another screen appears that requires the user to define a recipient or a group of recipients, as shown in FIG. 7. If the user elects to send an e-mail to a group of recipients, transmission of the e-mail is suspended until at least two recipients are identified.

If the user chooses to compose an attachment, a template is displayed as in FIG. 6. The template provides all of the fields required for composing an e-mail attachment. As described above, the user first supplies destination addresses according to the GUI in FIG. 7. The system then provides a GUI to assist in identifying the file to be attached, as in FIG. 8. This GUI allows the user to specify what category of files are to be attached. The system can then provide more screens to assist the user in locating the files to be attached.

If the user elects to send a "Message with attachment," the template for configuring an attachment is presented once the template for a message is completed. Therefore, the user will not forget to attach the intended files along with the composed e-mail message.

Thus, it is readily seen that the method and system of the present invention provides for improved e-mail communications when e-mail attachments are to be transmitted from the user's computer to another. The system detects when the user intends to send an e-mail attachment, and reminds the user to configure an e-mail attachment prior to the transmission of the e-mail communication.

The foregoing disclosure of embodiments of the present invention and specific examples illustrating the present invention have been present for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

Therefore, having thus described the invention, at least the following is claimed:

1. A method for configuring an email communication, comprising:
    a computer providing a first menu of a plurality of different types of email communications, wherein the plurality of different types of email communications comprises at least an email message unaccompanied with an attachment; an attachment file unaccompanied with email text; and an email message accompanied by an attachment file;
    the computer prompting a user to select a type of email communication from the plurality of different types of email communications before proceeding with composing the email communication;
    the computer receiving a selection of a type;
    the computer providing a template for each component of the selected type; and
    the computer transmitting the email communication of the selected type only after adequate information is received to facilitate composition of the selected type of email communication.

2. The method for configuring an email communication according to claim 1,
    wherein if the type that is selected is email message or a combination of an email message and an email attachment, providing a template to obtain information for the email communication; and
    wherein if the type that is selected is an email attachment or a combination of an email message and an email attachment, prompting the user to select an attachment.

3. The method for configuring an email communication according to claim 1, wherein at least one of the provided templates displays necessary information to be provided by the user, the necessary information including a selection of categories related to destination address information.

4. The method for configuring an email communication according to claim 3, wherein one of the at least one provided templates includes a field for identifying at least one destination email address, and a menu displays options for identifying the at least one destination email address.

5. The method for configuring an email communication according to claim 4, further comprising:
    receiving, in response to the menu in the one of the at least one provided templates, a selection to include a plurality of destination email addresses;
    generating a first prompt to identify destination email addresses; and generating a second prompt if a plurality of destination email addresses are not received, the second prompt informing the user of information not received.

6. A method for configuring an email communication according to claim 1, further comprising:

providing a series of additional menus for different fields in the template, wherein each menu provides a series of options for determining information corresponding to each respective field.

7. The method for configuring an email communication according to claim 6, wherein the email communication is transmitted after the user provides information for necessary fields in each template provided to the user.

8. The method for configuring an email communication according to claim 1, further comprising:

detecting whether information is entered for each field provided in the template;

wherein if the type that is selected is email message or a combination of an email message and an email attachment, providing a template to obtain information for the email communication; and wherein if the type that is selected is an email attachment or a combination of an email message and an email attachment, prompting the user to select an attachment.

9. A system for configuring email communications based on a user-selected type, comprising:

a menu display of different types of email communications, wherein the different types of email communications comprise at least an email message unaccompanied with an attachment; an attachment file unaccompanied with email text; and an email message accompanied by an attachment file;

an input means for receiving a selection of a type of email communication; and a processor for generating a template for each component of the type of email communication selected by user and for generating a prompt for prompting the user to select a type of email communication from the different types of email communications before proceeding with composing the email communication, wherein the email communication is transmitted after the user provides information for the necessary fields in each template provided to the user, or after at least one attachment is supplied.

10. The system for configuring email communications according to claim 9, wherein the system comprises a server, the server comprising the processor;

wherein the processor is further configured to provide a template to obtain information for the email communication if the type that is selected is email message or a combination of an email message and an email attachment; and wherein the processor is further configured to prompt the user to select an attachment if the type that is selected is an email attachment or a combination of an email message and an email attachment.

11. The system for configuring email communications according to claim 9, further comprising:

a first data base for storing a plurality of menus, wherein each menu provides a list of options for composing the email communication; and a second data base for storing a plurality of templates, wherein each template is associated with an option and identifies fields for transmission of the email communication having selected options.

12. The system for configuring email communications according to claim 11, further comprising a detector for detecting whether information is entered for necessary fields of each template provided.

13. The system for configuring email communications according to claim 11, further comprising a user interface for displaying the plurality of menus from the first data base, for prompting the user to select a menu from the first data base, for receiving selections of options, and for providing the plurality of templates in response to selections of options.

14. The system for configuring email communications according to claim 11, further comprising a network interface for transmitting the email communication when information is provided for each of the necessary fields.

15. Computer memory for storing instructions for performing a method for configuring an email communication, the instructions when executed by a computer causing the computer to:

provide a menu of a plurality of different types of email communications wherein the plurality of different types of email communications comprises at least an email message unaccompanied with an attachment; an attachment file unaccompanied with email text; and an email message accompanied by an attachment file;

prompt a user to select a type of email communication from the plurality of different types of email communications before proceeding with composing the email communication;

receive a selection of a type;

provide a template for each component of the selected type; and transmit the email communication of the selected type only after adequate information is received to facilitate composition of the selected type of email communication.

16. The computer memory of claim 15, further comprising instructions causing the computer to:

provide a template from a server to obtain information for the email communication if the type of email communication that is selected is an email message or a combination of an email message and an email attachment, and prompt the user to select an attachment if the type of email communication that is selected is an email attachment or a combination of an email message and an email attachment.

17. The computer memory of claim 15, further comprising instructions causing the computer to:

provide at least one template which includes a field for identifying at least one destination email address; and provide a menu to display options for identifying the at least one destination email address.

18. The computer memory of claim 17, further comprising instructions causing the computer to:

receive, in response to the menu in the provided at least one template, a selection to include a plurality of destination email addresses;

generate a prompt to identify destination email addresses.

19. The computer memory according to claim 15, further comprising a user interface for displaying the menu, for receiving selections of types, and for displaying the template in response to the selections of types.

20. Computer memory for storing instructions for performing a method for configuring an email communication, the instructions when executed by a computer causing the computer to:

provide a menu of a plurality of different types of email communications wherein the plurality of different types of email communications comprises at least an email message unaccompanied with an attachment; an attachment file unaccompanied with email text; and an email message accompanied by an attachment file;

prompt a user to select a type of email communication from the plurality of different types of email communications before proceeding with composing the email communication;

receive a selection of a type;

provide a template for each component of the selected type; and if the selected type of email communication includes an attachment, prohibit sending of the email communication until at least one attachment is attached.

21. The computer memory of claim 20, further comprising instructions causing the computer to:

provide a template from a server to obtain information for the email communication if the type of email communication that is selected is an email message or a combination of an email message and an email attachment, and prompt the user to select an attachment if the type of email communication that is selected is an email attachment or a combination of an email message and an email attachment.

22. The computer memory of claim 21, wherein the attachment comprises at least one of a word processing document, a graphics file, an audio/video file, a speech file, an executable program, and a spreadsheet.

23. The computer memory of claim 20, further comprising instructions causing the computer to:

provide at least one template which includes a field for identifying at least one destination email address; and provide a menu to display options for identifying the at least one destination email address.

24. The computer memory of claim 23, further comprising instructions causing the computer to:

receive, in response to the menu in the provided at least one template, a selection to include a plurality of destination email addresses;

generate a prompt to identify destination email addresses.

* * * * *